United States Patent [19]
Kii et al.

[11] Patent Number: 5,085,458
[45] Date of Patent: Feb. 4, 1992

[54] ATTITUDE CHANGE SUPPRESSION CONTROL SYSTEM FOR ACTIVE SUSPENSION SYSTEM WITH HIGH SENSITIVITY OF VEHICULAR ATTITUDE CHANGE

[75] Inventors: Katsuya Kii, Nara; Kunio Katada, Tochigi; Yuji Okuyama, Tochigi; Takashi Yonezawa, Tochigi, all of Japan

[73] Assignee: Nissan Motor Company, Limited, Japan

[21] Appl. No.: 564,495

[22] Filed: Aug. 8, 1990

[30] Foreign Application Priority Data

Aug. 9, 1989 [JP] Japan .................................. 1-206568
Aug. 9, 1989 [JP] Japan .................................. 1-206569

[51] Int. Cl.$^5$ .............................................. B60G 11/26
[52] U.S. Cl. ................................. 280/707; 280/840; 280/703; 364/424.05
[58] Field of Search ................ 280/840, 6.1, 707, 703; 364/424.05

[56] References Cited

U.S. PATENT DOCUMENTS 4,809,957 3/1989 Schonfeld et al. .................. 280/707
4,826,141 5/1989 Buma et al. ......................... 280/707
4,852,863 8/1989 Breitenbacher et al. ........... 280/707

FOREIGN PATENT DOCUMENTS 0249209 6/1987 European Pat. Off. .
0249227 6/1987 European Pat. Off. .
0283004 3/1988 European Pat. Off. .
0284053 3/1988 European Pat. Off. .
0285153 3/1988 European Pat. Off. .
0286072 4/1988 European Pat. Off. .

Primary Examiner—Kenneth R. Rice
Attorney, Agent, or Firm—Lowe, Price LeBlanc & Becker

[57] ABSTRACT

An active suspension system includes vertical acceleration sensors provided at positions where suspension systems associated with respective vehicular wheels are provided. A control unit receives vertical acceleration data of the respective suspension systems for processing the received data for deriving control command values representative of required damping magnitudes at the respective suspension systems. For this, the control unit derives angular velocity of vehicular attitude change. The control command value is thus derived on the basis of the vehicular attitude change and angular velocity.

35 Claims, 9 Drawing Sheets

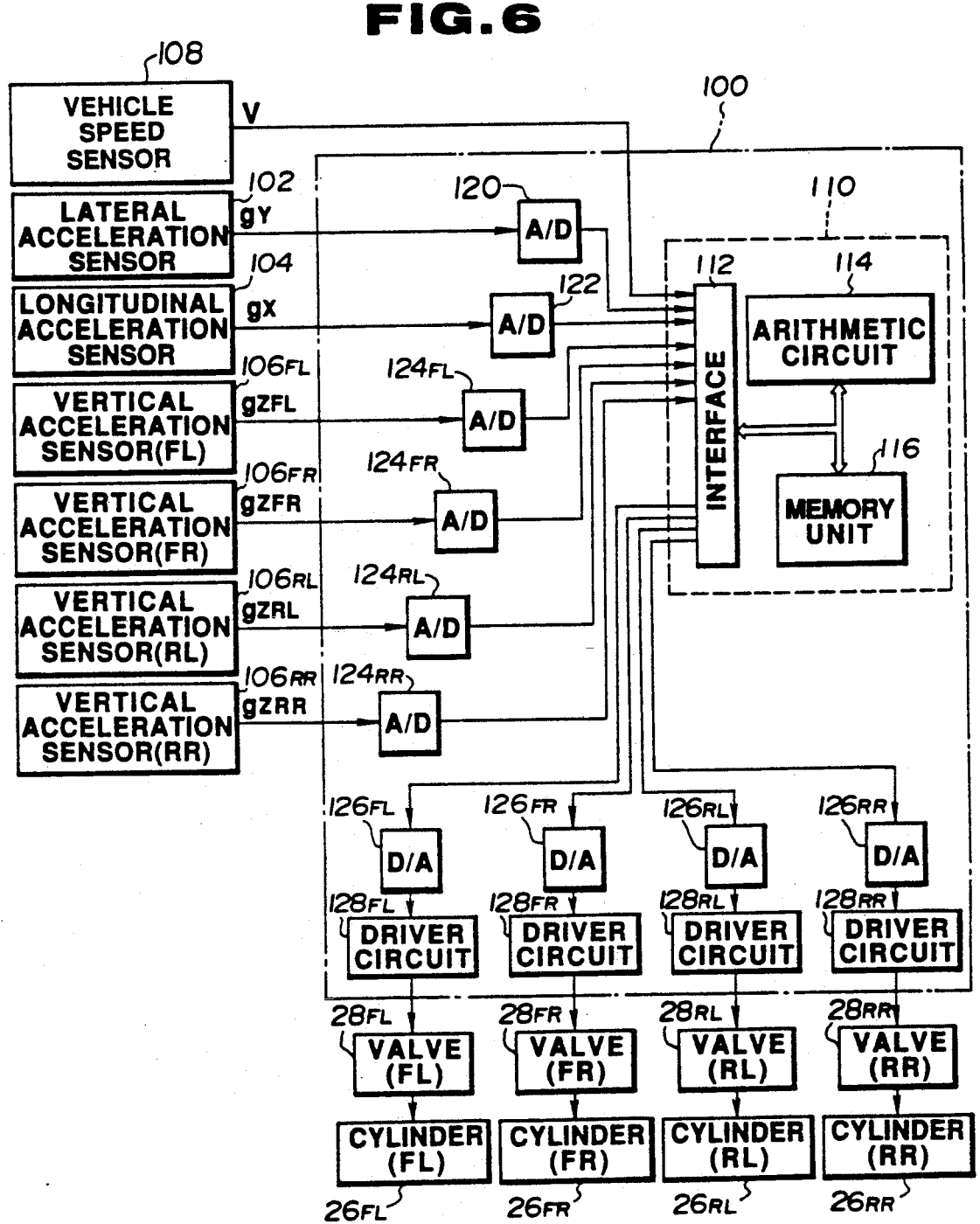

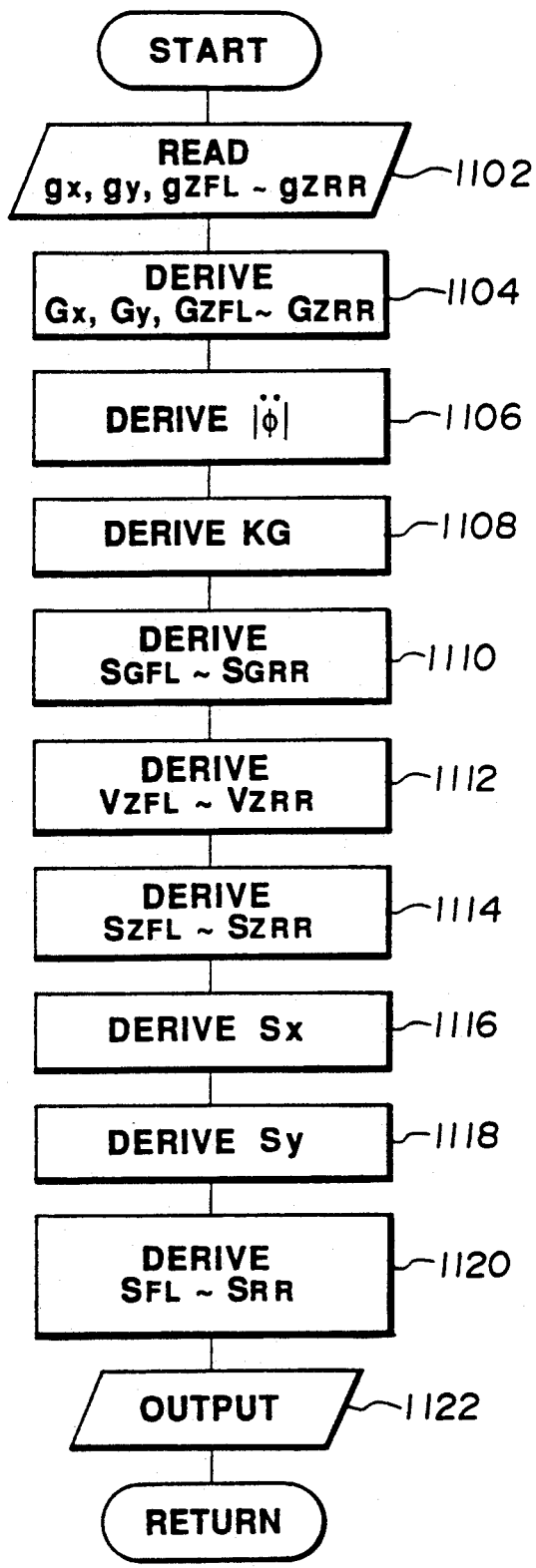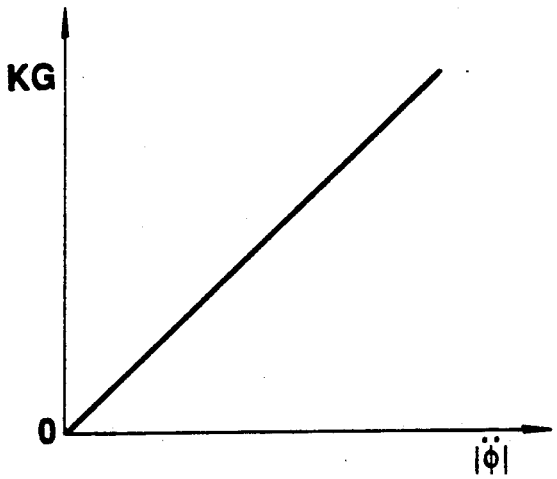

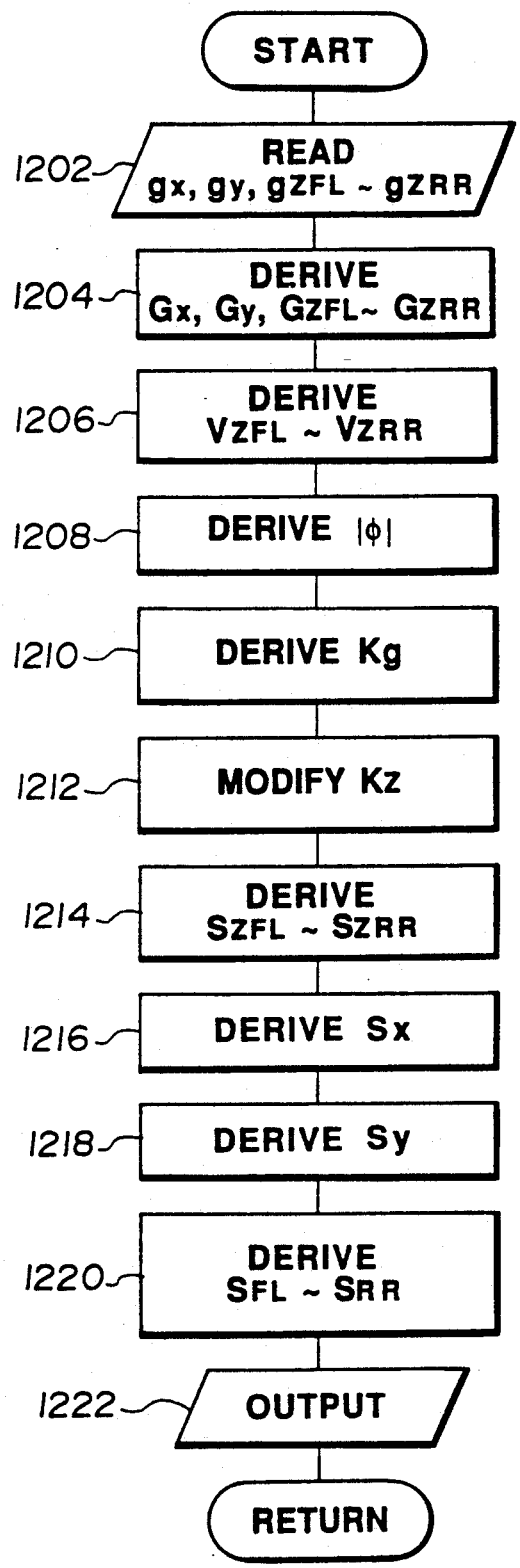

ATTITUDE CHANGE SUPPRESSION CONTROL SYSTEM FOR ACTIVE SUSPENSION SYSTEM WITH HIGH SENSITIVITY OF VEHICULAR ATTITUDE CHANGE

BACKGROUND OF THE INVENTION

1. Field of the Invention

The present invention relates to an active suspension system for an automotive vehicle. More specifically, the invention relates to an active suspension system which is provided high sensitivity in detecting vehicular attitude change, such as rolling and pitching, for providing high level stability of the vehicular attitude.

2. Description of the Background Art

U.S. Pat. No. 4,865,347, discloses an actively controlled suspension system including an anti-roll control loop which is responsive to lateral acceleration to be exerted on a vehicle, to adjust suspension characteristics. The control loop employed suspension system is variable of responsive characteristics to vehicular rolling depending upon the vehicle speed for varying anti-rolling suspension control characteristics. In a range of the vehicle speed in which the greater loop gain of the control loop causes significant and unacceptable level of self-induced lateral vibration, the gain is varied to be of smaller value than that in other vehicle speed range. Since the greater gain may cause self-induced lateral vibration in substantially low vehicle speed range, the gain main be adjusted to be smaller while the vehicle speed is lower than a given value.

U.S. Pat. No. 488,696, discloses an actively controlled automotive suspension system employing a factor representative of self- induced attitude change as a correction factor in attitude regulating suspension control. Suspension characteristics are controlled on the basis of a rolling and/or pitching energy representing parameter. The correction factor representative of self-induced attitude change is derived on the basis of vehicular attitude change velocity for canceling the self-induced rolling and/or pitching. By canceling the self induced rolling and/or pitching creative component from the rolling and/or pitching acceleration factor, higher rolling and/or pitching response characteristics can be provided so as to satisfactory high driving stability and riding comfort.

U.S. Pat. No. 4,872,701, discloses a suspension control system for an automotive vehicle which is designed for effectively suppressing pitching motion and whereby regulating vehicular attitude. The suspension control system monitors a pitching moment to be exerted on the vehicle for adjusting response characteristics in pitching-suppressive control depending upon the magnitude of the pitching moment to be exerted. The suspension control system adjustments the response characteristics of the front and rear suspensions independently of each other according to preset pitching-suppressive control coefficients respectively for the front and rear suspensions, which are set depending upon the suspension characteristics and/or suspension geometry of the vehicle, to which the suspension control system is to be applied.

In the type of the active suspension systems which performs attitude change suppressive control on the basis of longitudinal and/or lateral acceleration exerted on the vehicular body, difficulty is encountered by a performing attitude change suppression when vehicular attitude change, e.g. rolling or pitching, is induced in cause other than longitudinal or lateral acceleration. Such type or vehicular rolling or pitching can be induced due to undulation on the road surface when the road surface condition is not smooth.

SUMMARY OF THE INVENTION

Therefore, it is an object of the present invention to provide an active suspension system which can detect vehicular attitude change even when the attitude change is induced by a cause other than attitude change inducing acceleration exerted on the vehicular body.

In order to the aforementioned and other objects, an active suspension system, according to the present invention, includes vertical acceleration sensors provided at orientations where respective suspension systems associated with respective vehicular wheels are provided. A control unit receives vertical acceleration data of respective suspension system for processing the received data for deriving control command values representative of required damping magnitude at the respective suspension systems. For this, the control unit derives angular velocity of vehicular attitude change. The control command value is thus derived on the basis of the vehicular attitude change angular velocity.

According to one aspect of the invention, an active suspension system comprises:

suspension systems, each being disposed between a vehicular body and each road wheel, each of the suspension systems including a variable pressure working chamber for generating damping force against relative displacement between the vehicular body and the road wheel;

a hydraulic system connected to the working chamber for adjusting fluid pressure therein, the hydraulic system including a pressure control valve for controlling introduction and draining of pressurized fluid in the working chamber for adjusting the fluid pressure in the working chamber;

first sensors for monitoring vertical displacement of vehicular body at mutually different position of the vehicular body for producing first sensor signals respectively representative of vertical displacement of the vehicular body at the associated position; and control means responsive to the first sensor signals from said first sensors to determine a vehicular attitude variation, said control means outputting control signals based on the vehicular attitude variation to the pressure control valves respectively to provide control pressure in the working chambers of said suspension systems for thereby suppressing the vehicular attitude variation.

Each of the first sensors may monitor a vertical acceleration exerted on the associated position of the vehicular body to produce the first sensor signal indicative thereof. The control means processes each of the first sensor signals for deriving an angular velocity of vehicular attitude variation for deriving the control pressure on the basis thereof. The control means processes the first sensor signals for deriving vertical motion speeds at associated positions of the vehicular body and deriving the angular velocity of vehicular attitude variation on the basis of the vertical motion speeds. In the alternative, the control means processes the first sensor signals for deriving an angular acceleration of vehicular attitude variation for deriving control signals based thereon.

The control means may derive a vertical motion speed on the basis of the first sensor signal at the associated position of the vehicular body for deriving the vertical motion suppressive pressure on the basis thereof the vertical motion speed, deriving a correction value for correcting the vertical motion suppressive pressure on the basis of the vehicular attitude variation for deriving the control pressure. Each of the first sensor monitors vertical acceleration at associated position of the vehicular body and the control means derives an angular velocity of vehicular attitude variation for deriving the correction value based thereon. Alternatively, each of the first sensor monitors vertical acceleration at an associated position of the vehicular body and the control means derives an angular acceleration of vehicular attitude variation for deriving the correction value based thereon.

According to another aspect of the invention, a rolling suppressive active suspension system comprises:
- suspension systems, each being disposed between a vehicular body and each road wheel, each of the suspension systems including a variable pressure working chamber for generating damping force against relative displacement between the vehicular body and the road wheel;
- a hydraulic system connected to the working chamber for adjusting fluid pressure therein, the hydraulic system including a pressure control valve for controlling introduction and draining of pressurized fluid in the working chamber for adjusting the fluid pressure in the working chamber;
- first sensors for monitoring vertical displacement of vehicular body at mutually different position of the vehicular body for producing first sensor signals respectively representative of vertical displacement of the vehicular body at the associated position; and
- control means responsive to the first sensor signals from said first sensors to determine vehicular rolling, said control means outputting control signals based on the vehicular rolling to the pressure control valves respectively to provide control pressure in the working chambers of said suspension systems for thereby suppressing the vehicular rolling.

According to a further aspect of the invention, a pitching suppressive active suspension system comprises:
- suspension systems, each being disposed between a vehicular body and each road wheel, each of the suspension systems including a variable pressure working chamber for generating damping force against relative displacement between the vehicular body and the road wheel;
- a hydraulic system connected to the working chamber for adjusting fluid pressure therein, the hydraulic system including a pressure control valve for controlling introduction and draining of pressurized fluid in the working chamber for adjusting the fluid pressure in the working chamber;
- first sensors for monitoring vertical displacement of vehicular body at mutually different position of the vehicular body for producing first sensor signals respectively representative of vertical displacement of the vehicular body at the associated position; and
- control means responsive to the first sensor signals from said first sensors to determine vehicular rolling, said control means outputting control signals based on the vehicular rolling to the pressure control valves respectively to provided control pressure in the working chambers of said suspension systems for thereby suppressing the vehicular rolling.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 6 is a block diagram showing a another construction of a control system associated with the preferred embodiment of the active suspension system of FIG. 1;

FIG. 8 is a flowchart showing another rolling control routine for deriving the suspension control command;

FIG. 9 is a chart showing relationship between control gain and rolling angular acceleration;

FIG. 10 is a flowchart showing a pitching control routine for deriving the suspension control command, which routine is applicable for the preferred embodiment of the control system of FIG. 2;

DESCRIPTION OF THE PREFERRED EMBODIMENT

Figure 1:
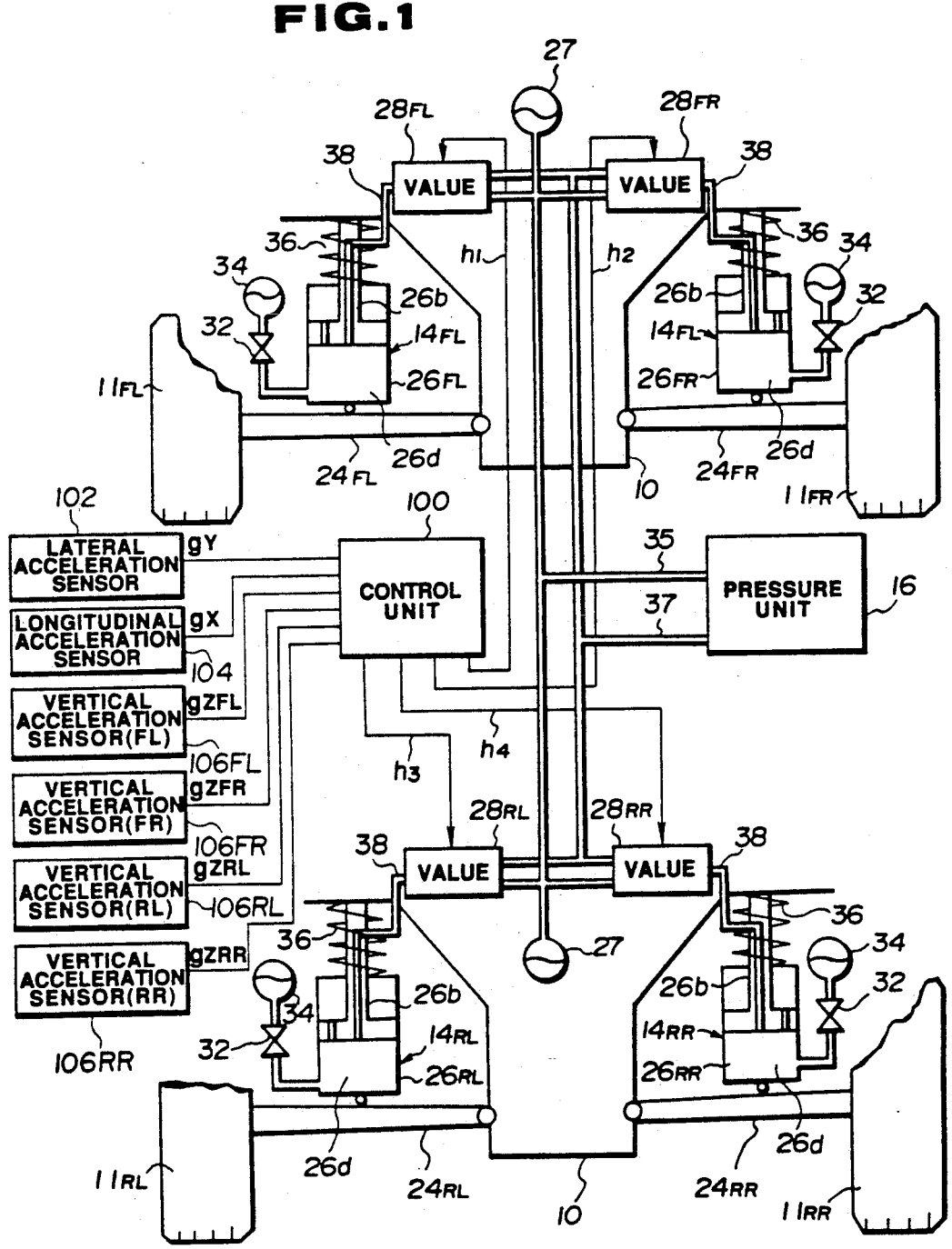
FIG. 1 is a diagrammatic illustration of the preferred embodiment of an active suspension control system, according to the present invention.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right. rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14" Respective front-left, front-right, rear left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinders 26 is disposed between the vehicular body 10 and a corresponding suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following prior applications or publications:

U.S. Pat. No. 4,903,983
U.S. Pat. application Ser. No. 059,888, filed on June 9, 1987, corresponding European patent Application has been published as First Publication No. 02 49 209;
U.S. Pat. application Ser. No. 060,856, filed on June 12, 1987, corresponding European Patent Application has been published as First Publication No. 02 49 227;
U.S. Pat. No. 4,909,534
U.S. Pat. No. 4,801,165, filed
U.S. Pat. No. 4,888,696
U.S. Pat. No. 4,865,348
U.S. Pat. No. 4,938,499
U.S. Pat. No. 4,943,084
U.S. Pat. No. 4,967,360
U.S. Pat. application Ser. No. 261,870, filed on Oct. 25, 1988;
U.S. Pat. No. 4,905,152
U.S. Pat. No. 4,919,440
U.S. Patent Application Serial No. 303,338, filed on Jan. 26, 1989;
U.S. Pat. No. 4,973,079
U.S. Pat. No. 4,911,469
U.S. Pat. No. 4,948,165
U.S. Pat. No. 4,911,468
U.S. Pat. No. 4,911,470
U.S. Pat. application Ser. No. 364,477, filed on June 12, 1989
U.S. Pat. application Ser. No. 365,468, filed on June 12, 1989

The disclosures of the above-identified co-pending U.S. Pat. applications and issued Patents are incorporated herein by reference for their disclosures.

The actuators are connected to a microprocessor based control unit 100. The control unit 100 is connected to a lateral acceleration sensor 102, a longitudinal acceleration sensor 104, vertical acceleration sensors 106FL, 106FR, 106RL and 106RR. As is well known, the lateral acceleration sensor 102 monitors a lateral acceleration exerted on the vehicular body to produce a lateral acceleration indicative signal $g_y$. Similarly, the longitudinal acceleration sensor 104 monitors a longitudinal acceleration exerted on the vehicle body to produce a longitudinal acceleration indicative signal $g_x$. The vertical acceleration sensors 106FL, 106FR, 106RL and 106RR are provided at respective positions where front-left, front-right, rear-left and rear-right suspension mechanisms 14FL, 14FR, 14RL and 14RR are provided. The vertical acceleration sensors 106FL, 106FR, 106RL and 106RR monitor vertical acceleration at the associated suspension mechanisms 14FL, 14FR, 14RL and 14RR to produce front-left, front-right, rear-left and rear-right vertical acceleration indicative signals $g_{zFL}$, $g_{zFR}$, $g_{zRL}$ and $g_{zRR}$.

Figure 2:
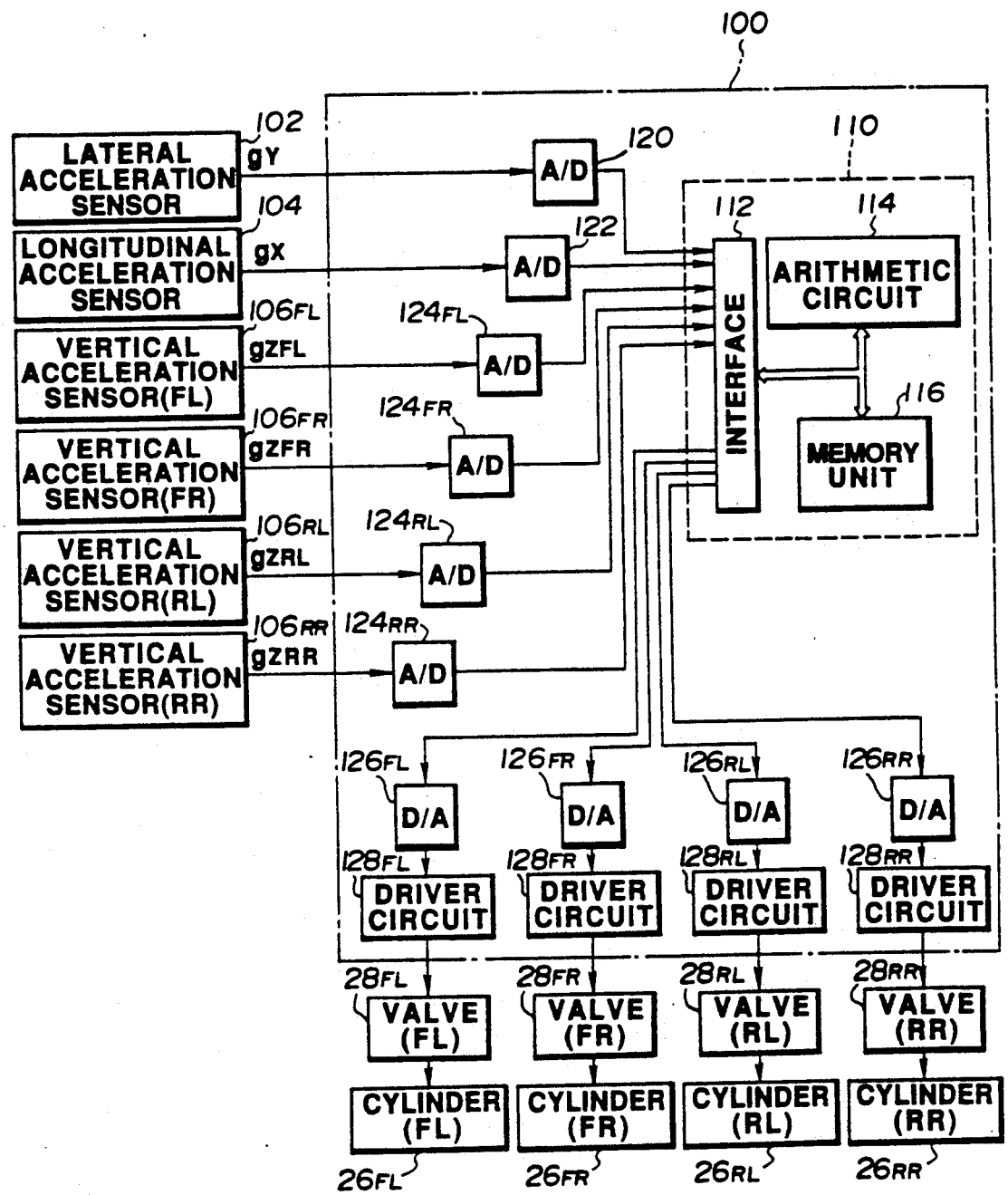
FIG. 2 is a block diagram showing a preferred construction of a control system associated with the preferred embodiment of the active suspension system of FIG. 1.

As shown in FIG. 2, the control unit 100 comprises a microprocessor 110 which includes an input/output interface 112, an arithmetic circuit 114 and a memory unit 116. The lateral acceleration sensor 102 is connected to the input/output interface 112 of the microprocessor 110 via an analog-to-digital (A/D) interface 120. The A/D converter 120 converts the analog form lateral acceleration indicative signal $g_y$ into a lateral acceleration indicative digital signal. On the other hand, the longitudinal acceleration sensor 104 is connected to the input/output interface 112 via an A/D converter 122. The A/D converter 122 converts the analog form longitudinal acceleration indicative signal $g_x$ into a digital form longitudinal acceleration indicative digital signal. Also, respective of the front-left, front-right, rear-left and rear-right vertical acceleration sensors 106FL, 106FR, 106RL and 106RR are connected to the input/output interface 112 via A/D converters 124FL, 124FR, 124RL and 124RR. The A/D converters 124FL, 124FR, 124RL and 124RR converts analog form front-left, front-right, rear-left and rear-right vertical acceleration indicative signals $g_{zFL}$, $g_{zFR}$, $g_{zRL}$ and $g_{zRR}$ into digital form vertical acceleration indicative digital signals.

The microprocessor 110 processes the lateral acceleration indicative digital signals, the longitudinal acceleration digital signals and the front-left, front-right, rear-left and rear-right vertical acceleration indicative digital signals for deriving front-left, front right, rear-left and rear right suspension control commands $S_{FL}$, $S_{FR}$, $S_{RL}$ and $S_{RR}$. The suspension control commands $S_{FL}$, $S_{FR}$, $S_{RL}$ and $S_{RR}$ are current signal having current level corresponding to the magnitude of adjustment of the fluid pressure.

Figure 3:
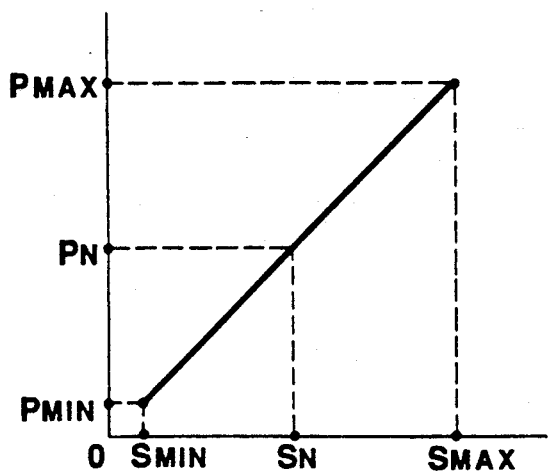
FIG. 3 is a chart showing relationship between current level of a suspension control command and fluid pressure in a working chamber in the preferred embodiment of the active suspension system.

As can be seen from FIG. 3, the current value of the suspension control command is variable between a predetermined minimum value $S_{MIN}$ and a predetermined maximum value $S_{MAX}$. The fluid pressure becomes minimum $P_{MIN}$ at the minimum value $S_{MIN}$ of the suspension control command and becomes maximum $P_{MAX}$ at the maximum value $S_{MAX}$ of the suspension control command. The minimum value $S_{MIN}$ of the suspension control command is set in view of noise possible superimposed on the suspension control current. As can be seen, the fluid pressure in the working chamber 26d of the hydraulic cylinder 26 linearly varies between the maximum pressure level $P_{MAX}$ and the minimum pressure level $P_{MIN}$ across a predetermined neutral pressure $P_N$ corresponding to the current level $S_N$.

Figure 4:
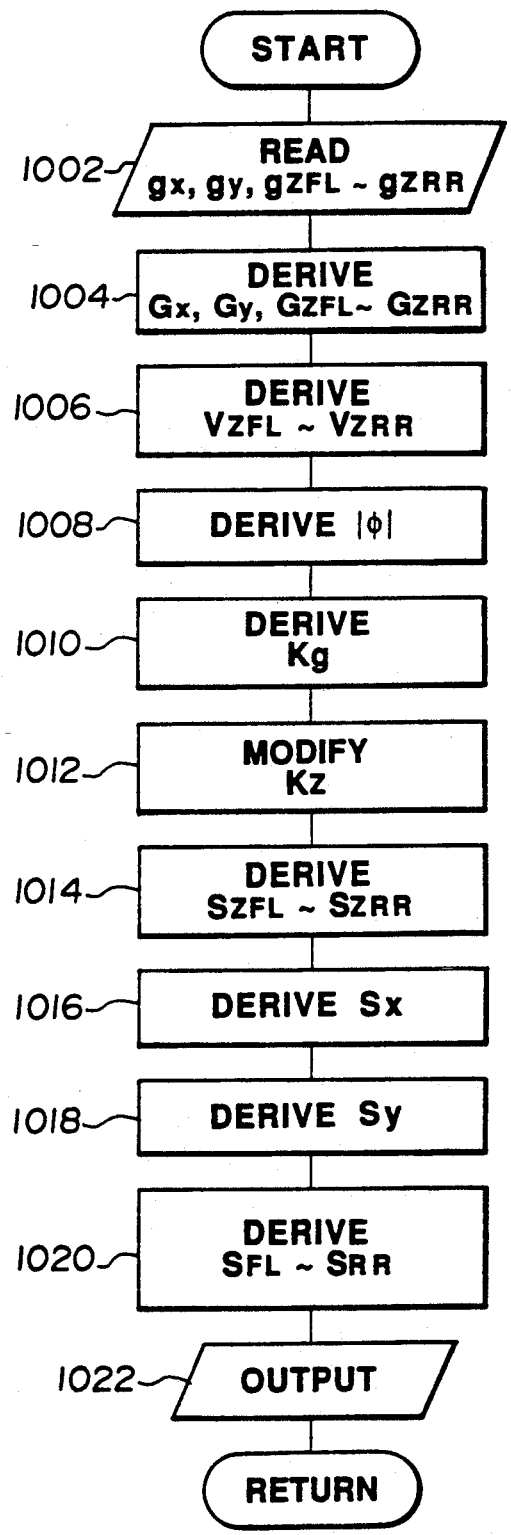
FIG. 4 is a flowchart showing a rolling control routine for deriving the suspension control command.

FIG. 4 shows a routine for deriving the suspension control command to be executed by the microprocessor 110 in the control unit 100. The shown routine is executed every predetermined timing, e.g. every 20 msec. Immediately after starting execution, the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ are read out at a step 1002. Based on the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ read at the step 1002, a lateral acceleration data $G_y$, a longitudinal acceleration data $G_x$ and front-left, front-right, rear-left and rear-right vertical acceleration data $G_{zFL}$, $G_{zFR}$, $G_{zRL}$ and $G_{zRR}$ are derived at a step 1004.

Figure 5:
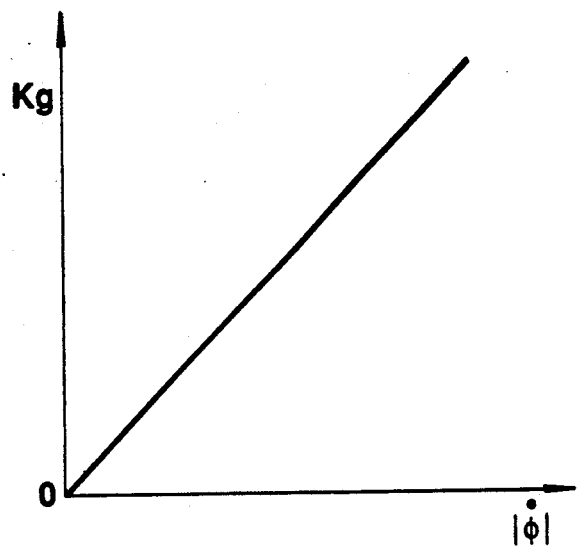
FIG. 5 is a chart showing relationship between control gain and rolling angular velocity.

Then, at a step 1006, front-left, front-right, rear-left and rear-right vertical motion speed data $V_{zFL}$, $V_{zFR}$, $V_{zRL}$ and $V_{zRR}$ are derived by integrating the front-left, front-right, rear-left and rear right vertical acceleration data $G_{zFL}$, $G_{zFR}$, $G_{zRL}$ and $G_{zRR}$ over a predetermined period of time. Thereafter, at a step 1008, a rolling angular velocity indicative data $\dot{V}$ is derived on the basis of the front left and front-right vertical motion speeds $V_{zFL}$ and $V_{zFR}$ Namely, in the shown embodiment, an absolute value of the front-left and front-right vertical motion speeds $V_{zFL}$ and $V_{zFR}$ is used as the rolling angular velocity indicative data $\dot{V}$. Based on the rolling angular velocity indicative data $\dot{V}$, a gain correction value Kg is derived at a step 1010. In practice, a table of the gain correction value Kg is set in the memory unit 116 in the control unit 110 so as to be looked up in terms of the rolling angular velocity indicative data $\dot{V}$. In the shown embodiment, the table set in the memory unit 116 varies the control gain in linear fashion in relation to the rolling angular velocity indicative data $\dot{V}$, as shown in FIG. 5.

Thereafter, at a step 1012, a preset control gain Kz is modified by adding the gain correction value Kg derived at the step 1010. Then, vertical motion speed dependent control values $S_{zFL}$, $S_{zFR}$, $S_{zRL}$ and $S_{zRR}$ are derived on the basis of the front-left, front-right, rear-left and rear-right vertical motion speed data $V_{zFL}$, $V_{zFR}$, $V_{zRL}$ and $V_{zRR}$, and the control gain Kz modified at the step 1012, at a step 1014. In practice, the vertical motion speed dependent suspension control values $S_{zFL}$, $S_{zFR}$, $S_{zRL}$ and $S_{zRR}$ are derived by multiplying respective of the vertical motion speed data $V_{zFL}$, $V_{zFR}$, $V_{zRL}$ and $V_{zRR}$ with the control gain Kz.

At step 1016, an anti pitching correction value $S_x$ is derived on the basis of the longitudinal acceleration data $G_x$. In practice, the anti-pitching correction value $S_x$ is calculated by multiplying the longitudinal acceleration data $G_x$ with a predetermined anti-pitching control gain $K_x$. Similarly, at a step 1018, an anti-rolling correction value $S_y$ is derived on the basis of the lateral acceleration data $G_y$. In practice, the anti-pitching correction value $S_y$ is calculated by multiplying the lateral acceleration data $G_y$ with a predetermined anti-pitching control gain $K_y$.

The manner of deriving the anti-pitching correction value $K_y$ and the anti-rolling correction values are well disclosed in the following pending U.S. Pat. Nos. 4,865,347, 4,888,696 and 4,872,701, set forth above. The disclosures of these co-pending U.S. Pat. application are incorporated by herein reference.

Then, the suspension control commands $S_{FL}$, $S_{FR}$, $S_{RL}$ and $S_{RR}$ are derived by the following equations, at a step 1020:

$$S_{FL} = S_{zFL} + S_x + S_y + S_N$$

$$S_{FR} = S_{zFR} + S_x + S_y + S_N$$

$$S_{RL} = S_{zRL} + S_x + S_y + S_N$$

$$S_{RR} = S_{zRR} + S_x + S_y + S_N$$

wherein $S_N$ is a predetermined height regulation control value, which can be a value for adjusting the vehicular height at a neutral height position but can be set at any appropriate value. Thereafter, suspension control signals $S_C$ representative of respective of the suspension control command values $S_{FL}$, $S_{FR}$, $S_{RL}$ and $S_{RR}$ are output at a step 1020.

Assuming that the vehicle travels on a flat and smooth road at constant speed in a straight line, no vehicular attitude change is caused. Therefore, the lateral acceleration indicative signal value $g_y$, the longitudinal acceleration indicative signal value $g_x$ and the vertical acceleration indicative signal values $g_{zFL}$, $g_{zFR}$, $g_{zRL}$ and $g_{zRR}$ are maintained at zero (0). Therefore, all of the suspension control command values derived at the step 1016 become $S_N$. Therefore, the vehicular height level is maintained at the height level represented by the height regulation control value $S_N$. Here, assuming that the height regulation control value $S_N$ represents the neutral height level of the vehicular body, the fluid pressure in the working chambers 26d of respective hydraulic cylinders 26FL, 26FR, 26RL and 26RR are maintained at neutral pressure $P_N$.

When the vehicular wheels 11FL, 11FR, 11RL and 11RR pass over undulations on the road surface, the vibration component in a frequency range corresponding to the resonance band of the vehicular body, can be absorbed by absorbing fluid pressure variation in the hydraulic system including the pressure control valves 28FL, 28FR, 28RL and 28RR. Namely, absorption of the vibration frequency corresponding to the vehicular body resonance frequency range is performed by supplying line pressure through the supply port of the pressure control valve to the working chamber 26d or draining the fluid pressure in the working chamber from the drain port of the pressure control valve by fluid pressure responsive valve action. On the other hand, the vibration component in a frequency range corresponding to the resonance frequency range of the road wheels, which frequency range is relatively high frequency range higher than that of the vehicular body resonance frequency range, is absorbed by the low pressure accumulators 34. As can be appreciated herefrom, as long as the magnitude of vibration is maintained within a capacity of vibration absorption of the hydraulic system including the pressure control valve and the pressure accumulator, the vehicular attitude changes may not be caused. As a result, the vehicular body is maintained at normal or horizontal position.

On the other hand, if the magnitude of relative low frequency vibration has a frequency range in the vicinity of resonance frequency of the vehicular body and becomes greater beyond the capacity of absorption by the valve action in the pressure control valve, vehicular attitude can be changed to induce bouncing, rolling or pitching. Such attitude change causes vertical displacement between the vehicular body and respective wheels. As a result, the vertical acceleration indicative signals $g_{zFL}$, $g_{zFR}$, $g_{zRL}$ and $g_{zRR}$ varied from zero value. Therefore, the vertical acceleration indicative data $G_{zFL}$, $G_{zFR}$, $G_{zRL}$ and $G_{zRR}$ is derived by the control unit 110. Based on the vertical acceleration data $G_{zFL}$, $G_{zFR}$, $G_{zRL}$ and $G_{zRR}$ thus derived, the vertical motion speed speed data $V_{zFL}$, $V_{zFR}$, $V_{zRL}$ and $V_{zRR}$ are derived. Therefore, based on the front-left and front-right vertical motion speed data $V_{zFL}$ and $V_{zFR}$, the rolling angular velocity indicative data $\dot{\emph{V}}$ is derived by deriving the difference of the front-left and front-right vertical motion speed data $V_{zFL}$ and $V_{zFR}$. Therefore, the gain correction value Kg is derived on the basis of the rolling angular velocity indicative data $\dot{\emph{V}}$. As a result, the control gain Kz for deriving the vertical motion dependent height control values $S_{zFL}$, $S_{zFR}$, $S_{zRL}$ and $S_{zRR}$ is modified with the gain correction value Kg. Therefore, the suspension control command values $S_{FL}$, $S_{FR}$, $S_{RL}$ and $S_{RR}$ are derived for regulating the vehicular height. Namely, in case rolling suppression, the fluid pressure in the working chamber at the suspension systems at which the vehicular height level is lowered, is increased. On the other hand, at the suspension systems at which the vehicular height level is risen, the fluid pressure in the working chamber is decreased. By adjusting the fluid pressure in the working chambers, the vehicular rolling can be successfully suppressed.

As can be appreciated herefrom, with the shown embodiment, even when the vehicular rolling or bouncing is induced due to undulation of the road surface irrespective of the magnitude of lateral acceleration, detection of vehicular rolling and rolling suppressive suspension control can be assured.

Furthermore, since the first preferred embodiment of the control system also incorporate the factor of lateral and longitudinal acceleration dependent control command components derived at the steps 1016 and 1018, vehicular attitude change, rolling and pitching, during cornering, acceleration and deceleration of the vehicle can also be successfully suppressed.

FIG. 6 shows another embodiment of the control system which is applicable for the preferred embodiment of the active suspension system of FIG. 1. In this embodiment, a vehicle speed sensor 108 is additionally employed for monitoring vehicle speed and for providing a vehicular speed indicative data V. The vehicle speed sensor per se is generally of known construction and associated with an output shaft of a power transmission or a propeller shaft for monitoring average speed of driving wheels and thus produces a pulse train form signal as the vehicle speed indicative signal.

Figure 7:
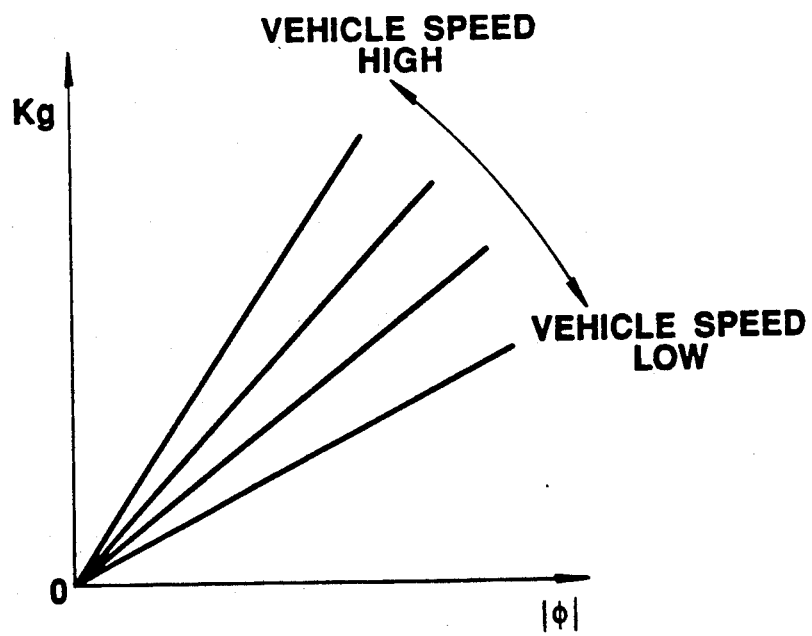
FIG. 7 is a chart similar to FIG. 5 but modified with employing vehicular speed as additional parameter.

In this embodiment, the gain correction value Kg to be derived at the step 1008 can be modified on the basis of the rolling angular velocity $\dot{\emph{V}}$ and, in addition, the vehicular speed indicative data V. Practically, in such case, a plurality of gain correction value tables as shown in FIG. 7 are set in the memory unit 116 so that one of the tables can be selected in relation to the vehicle speed indicative data V and table look-up is performed against the selected one of the tables in terms of the rolling angular velocity indicative data $\dot{\emph{V}}$. As can be seen from FIG. 7, the gain correction value tables set in the memory unit 116 are provided variation characteristics to have different increasing rate of the gain correction value according to increasing of the rolling angular velocity indicative data $\dot{\emph{V}}$. Namely, in the shown embodiment, the table having greater increasing rate is selected at higher vehicle speed.

Because magnitude of vehicular rolling is affected by the vehicular speed, introduction of the vehicular speed as additional parameter may allow further precise adjustment of damping characteristics of the suspension systems.

FIG. 8 shows a modified routine for controlling vehicular rolling. In the shown routine, a rolling angular acceleration $\ddot{\emph{V}}$ is employed as a parameter for deriving a vertical acceleration dependent control values $S_{GFL}$, $S_{GFR}$, $S_{GRL}$ and $S_{GRR}$.

Immediately after starting execution, the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ are read out at a step 1102. Based on the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ read at the step 1102, a lateral acceleration data $G_y$, a longitudinal acceleration data $G_x$ and front left, front-right, rear-left and rear right vertical acceleration data $G_{zFL}$, $G_{zFR}$, $G_{zRL}$ and $G_{zRR}$ are derived at a step 1104.

Then, at a step 1106, the vehicle speed indicative data V is read out. Based on the vehicle speed indicative data V, one of the plurality of the gain correction tables as shown in FIG. 7 is selected. At the step 1106, a rolling angular acceleration indicative data $\ddot{\emph{V}}$ is derived on the basis of the front-left and front right vertical acceleration indicative data $G_{zFL}$ and $G_{zFR}$. Hence, in the shown embodiment, an absolute value of a difference of the front-left and front-right vertical acceleration indicative data $G_{zFL}$ and $G_{zFR}$ is used as the rolling angular acceleration indicative data $\ddot{\emph{V}}$. Based on the rolling angular acceleration indicative data $\ddot{\emph{V}}$, a rolling angular acceleration dependent control gain KG is derived at a step 1108. In the shown embodiment, the rolling angular acceleration dependent control gain KG is variable depending upon magnitude of the rolling angular acceleration dependent control gain as shown in FIG. 9.

Thereafter, at a step 1112, vertical acceleration dependent control value $S_{GFL}$, $S_{GFR}$, $S_{GRL}$ and $S_{GRR}$ are calculated on the basis of the vertical acceleration indicative data $G_{zFL}$, $G_{zFR}$, $G_{zRL}$ and $G_{zRR}$ and the rolling angular acceleration dependent control gain KG. Practically, the vertical acceleration dependent control values $S_{GFL}$, $S_{GFR}$, $S_{GRL}$ and $S_{GRR}$ are derived by the following equations:

$$S_{GFL} = G_{zFL} \times KG$$

$$S_{GFR} = G_{zFR} \times KG$$

$$S_{GRL} = G_{zRL} \times KG$$

$$S_{GRR} = G_{zRR} \times KG$$

Then, at a step 1114, front-left, front right, rear left and rear-right vertical motion speed data $V_{zFL}$, $V_{zFR}$, $V_{zRL}$ and $V_{zRR}$ are derived by integrating the front-left, front-right, rear-left and rear-right vertical acceleration data $G_{zFL}$, $G_{zFR}$, $G_{zRL}$ and $G_{zRR}$ over a predetermined period of time. Then, vertical motion speed dependent control values $S_{zFL}$, $S_{zFR}$, $S_{zRL}$ and $S_{zRR}$ are derived on the basis of the front-left, front-right, rear-left and rear-right vertical motion speed data $V_{zFL}$, $V_{zFR}$, $V_{zRL}$ and $V_{zRR}$, and the predetermined control gain Kz at the step 1116. In practice, the vertical motion speed dependent suspension control values $S_{zFL}$, $S_{zFR}$, $S_{zRL}$ and $S_{zRR}$ are derived by multiplying respective of the vertical motion speed data $V_{zFL}$, $V_{zFR}$, $V_{zRL}$ and $V_{zRR}$ with the control gain Kz.

At step 1118, an anti-pitching correction value $S_x$ is derived on the basis of the longitudinal acceleration data $G_x$. In practice, the anti-pitching correction value $S_x$ is calculated by multiplying the longitudinal acceleration data $G_x$ with a predetermined anti-pitching control gain $K_x$. Similarly, at a step 1120, an anti-rolling correction value $S_y$ is derived on the basis of the lateral acceleration data $G_y$. In practice, the anti-pitching correction value $S_y$ is calculated by multiplying the lateral acceleration data $G_y$ with a predetermined anti-pitching control gain $K_y$.

The manner of deriving the anti-pitching correction value values are well disclosed in U.S. Pat. Nos. 4,865,347, 4,888,696, and 4,872,701, set forth above. The disclosures of these U.S. Pat. application are herein by reference.

Then, the suspension control commands $S_{FL}$, $S_{FR}$, $S_{RL}$ and $S_{RR}$ are derived by the following equations, at a step 1020:

$$S_{FL} = S_{GFL} + S_{zFL} + S_x + S_y + S_N$$

$$S_{FR} = S_{GFR} + S_{zFR} + S_x + S_y + S_N$$

$$S_{RL} = S_{GRL} + S_{zRL} + S_x + S_y + S_N$$

$$S_{RR} = S_{GRR} + S_{zRR} + S_x + S_y + S_N$$

wherein $S_N$, is a predetermined height regulation control value, which can be a value for adjusting the vehicular height at neutral height position but can be set at any appropriate value. Thereafter, suspension control signals $S_C$ representative of respective of the suspension control command values $S_{FL}$, $S_{FR}$, $S_{RL}$ and $S_{RR}$ are output at a step 1022.

As can be appreciated herefrom, according to the second preferred embodiment, the rolling angular acceleration dependent factor is introduced by utilizing the rolling angular acceleration indicative control values $S_{GFL}$, $S_{GFR}$, $S_{GRL}$ and $S_{GRR}$, rolling suppressive control can be performed even when the vehicular rolling is induced without causing noticeable lateral acceleration.

Similarly to the foregoing, it is further possible to employ the vehicular speed dependent factor for deriving the rolling angular acceleration dependent control gain as discussed with respect to the first embodiment in terms of the gain correction value Kg. Furthermore, though the foregoing embodiments utilize the rolling angular velocity and rolling angular acceleration as parameters for performing anti-rolling suspension control, it may also be possible to perform the anti-rolling control on the basis of rolling angle. In addition, though the shown embodiment employs vertical accelerations as parameters representative of relative vertical displacement between the vehicular body and the vehicular wheels, it may be replaced with the vertical strokes. Furthermore, though the shown embodiments derive the rolling angular velocity and the rolling angular acceleration on the basis of the vertical accelerations at the front wheels, it may possible to use the vertical accelerations of the rear wheels or average values of the vertical accelerations of the front and rear wheels.

FIGS. 10 to 14 shows process of anti-pitching suspension control for active suspension system. The construction of the active suspension system may be constructed identical to that illustrated in FIG. 1. Likewise, the control system for performing the anti-pitching control may be identical to those in FIGS. 2 and 6.

FIG. 10 shows a routine for performing anti-pitching suspension control according to the invention. The shown routine is executed at predetermined timing intervals, e.g. every 20 msec. Immediately after starting execution, the lateral acceleration indicative digital signal $g_y$, the longitudinal acceleration indicative digital signal $g_x$ and the front-left, front-right, rear-left and rear right acceleration indicative digital signals $g_{zFL}$, $g_{zFR}$, $g_{zRL}$ and $g_{zRR}$ are read out at a step 1202. Based on the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ read at the step 1202, a lateral acceleration data $G_y$, a longitudinal acceleration data $G_x$ and front-left, front-right, rear-left and rear-right vertical acceleration data $G_{zFL}$, $G_{zFR}$, $G_{zRL}$ and $G_{zRR}$ are derived at a step 1204.

Figure 11:
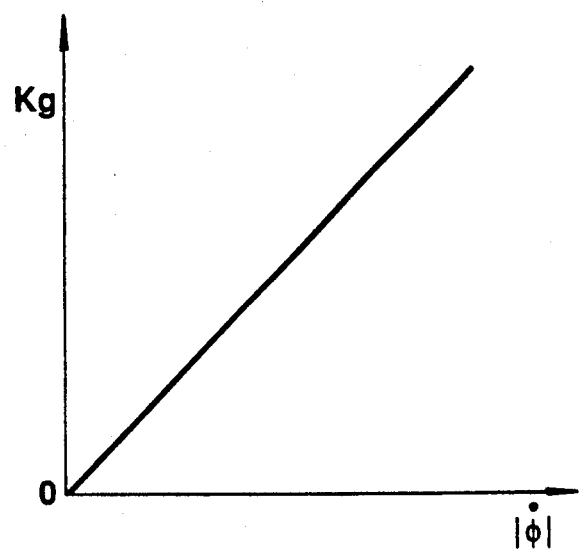
FIG. 11 is a chart showing relationship between control gain and pitching angular velocity.

Then, at a step 1206, front-left, front-right, rear-left and rear-right vertical motion speed data $V_{zFL}$, $V_{zFR}$, $V_{zRL}$ and $V_{zRR}$ are derived by integrating the front-left, front-right, rear-left and rear-right vertical acceleration data $G_{zFL}$, $G_{zFR}$, $G_{zRL}$ and $G_{zRR}$ over a predetermined period of time. Thereafter, at a step 1208, a pitching angular velocity indicative data $\dot{\phi}$, is derived on the basis of the front right and rear-right vertical motion speeds $V_{zFR}$ and $V_{zRR}$. Namely, in the shown embodiment, an absolute value of a difference of the front-left and front-right vertical motion speeds $V_{zFR}$ and $V_{zRR}$ is used as the pitching angular velocity indicative data $\dot{\phi}$. Based on the pitching angular velocity indicative data $\dot{\phi}$, a gain correction value Kg is derived at a step 1210. In practice, a table of the gain correction value Kg is set in the memory unit 116 in the control unit 110 so as to be looked up in terms of the pitching angular velocity indicative data $\dot{\phi}$. In the shown embodiment, the table set in the memory unit 116 varies the control gain in linear fashion in relation to the pitching angular velocity indicative data $\dot{\phi}$, as shown in FIG. 11.

Thereafter, at a step 1212, a preset control gain Kz is modified by adding the gain correction value Kg derived at the step 1210. Then, vertical motion speed dependent control values $S_{zFL}$, $S_{zFR}$, $S_{zRL}$ and $S_{zRR}$ are derived on the basis of the front-left, front-right, rear-left and rear-right vertical motion speed data $V_{zFL}$, $V_{zFR}$, $V_{zRL}$ and $V_{zRR}$, and the control gain Kz modified at the step 1212, at a step 1214. In practice, the vertical motion speed dependent suspension control values $S_{zFL}$, $S_{zFR}$, $S_{zRL}$ and $S_{zRR}$ are derived by multiplying respective of the vertical motion speed data $V_{zFL}$, $V_{zFR}$, $V_{zRL}$ and $V_{zRR}$ with the control gain Kz.

At step 1216, an anti-pitching correction value $S_x$ is derived on the basis of the longitudinal acceleration data $G_x$. In practice, the anti-pitching correction value $S_x$ is calculated by multiplying the longitudinal acceleration data $G_x$ with a predetermined anti-pitching control gain $K_x$. Similarly, at a step 1018, an anti-rolling correction value $S_y$ is derived on the basis of the lateral acceleration data $G_y$. In practice, the anti-rolling correction value $S_y$ is calculated by multiplying the lateral acceleration data $G_y$ with a predetermined anti-rolling control gain $K_y$.

The manner of deriving the anti-rolling correction value $K_y$ and the anti-pitching correction values are well disclosed in U.S. Pat. applications Nos. 4,865,347, 488,686, and 4,872,701, set forth above. The disclosures of these U.S. Pat. applications are incorporated herein by reference.

Then, the suspension control commands $S_{FL}$, $S_{FR}$, $S_{RL}$ and $S_{RR}$ are derived by the following equations, at a step 1220:

$$S_{FL} = S_{zFL} + S_x + S_y + S_N$$

$$S_{FR} = S_{zFR} + S_x + S_y + S_N$$

$$S_{RL} = S_{zRL} + S_x + S_y + S_N$$

$$S_{RR} = S_{zRR} + S_x + S_y + S_N$$

wherein $S_N$ is a predetermined height regulation control value, which can be a value for adjusting the vehicular height at neutral height position but can be set at a any appropriate value. Thereafter, suspension control signals $S_C$ representative of respective of the suspension control command values $S_{FL}$, $S_{FR}$, $S_{RL}$ and $S_{RR}$ are output at a step 1220.

As can be appreciated herefrom, substantially the same attitude change suppression can be achieved by the shown system as that illustrated in terms of anti-pitching control in FIG. 4. Therefore, with the shown embodiment, even when the vehicular pitching or bouncing is induced due to undulation of the road surface irrespective of the magnitude of lateral acceleration, detection of vehicular pitching and pitching suppressive suspension control can be assured.

Figure 12:
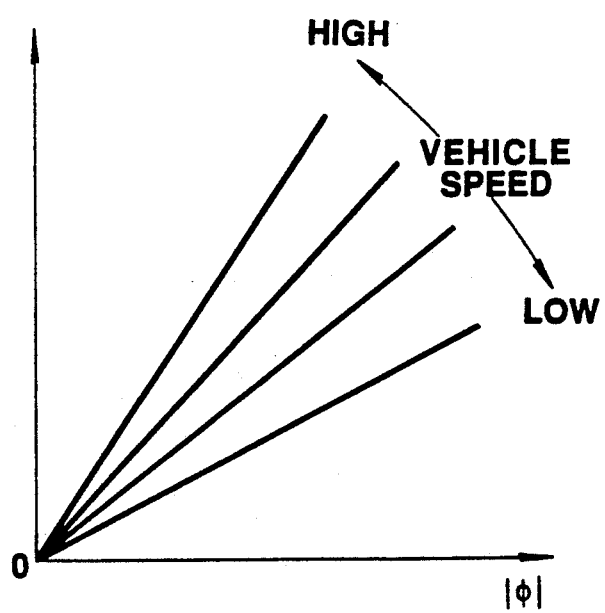
FIG. 12 is a chart similar to FIG. 1 but modified with employing vehicular speed as additional parameter.

In the shown embodiment, the gain correction value Kg to be derived at the step 1208 can be modified on the basis of the pitching angular velocity $\dot{\phi}$ and, in addition, the vehicular speed indicative data V. Practically, in such case, a plurality of gain correction value tables as shown in FIG. 12 are set in the memory unit 116 so that one of the tables can be selected in relation to the vehicle speed indicative data V and table look-up is performed against the selected one of the tables in terms of the pitching angular velocity indicative data $\dot{\phi}$. As can be seen from FIG. 12, the gain correction value tables set n the memory unit 116 are provided variation characteristics to have different increasing rate of the gain correction value according to increasing of the pitching angular velocity indicative data $\dot{\phi}$. Namely, in the shown embodiment, the table having greater increasing rate is selected at higher vehicle speed.

Because magnitude of vehicular pitching is affected by the vehicular speed, introduction of the vehicular speed as additional parameter may allow further precise adjustment of damping characteristics of the suspension systems.

Figure 13:
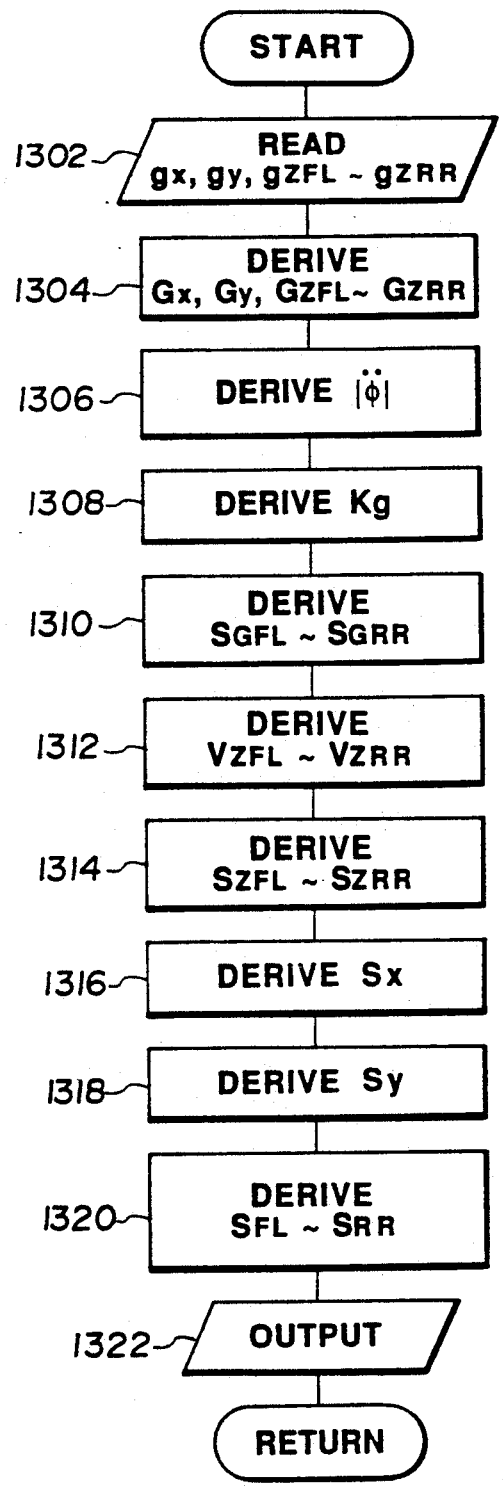
FIG. 13 is a flowchart showing another pitching control routine for deriving the suspension control command, which routine can be executed by the control system of FIG. 6.
Figure 14:
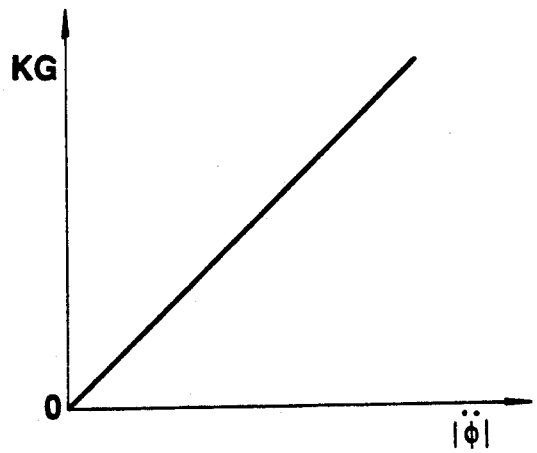
FIG. 14 is a chart showing relationship between control gain and pitching angular acceleration.

FIG. 13 controlling vehicular pitching. In the shown routine, a pitching angular acceleration $\ddot{\phi}$ is employed as a parameter for deriving a vertical acceleration dependent control values $S_{GFL}$, $S_{GFR}$, $S_{GRL}$ and $S_{GRR}$.

Immediately after starting execution, the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ are read out at a step 1302. Based on the lateral acceleration indicative digital signal $g_y$, the longitudinal acceleration indicative digital signal $g_x$ and the front-left, front-right, rear-left and rear-right acceleration indicative digital signals $g_{zFL}$, $g_{zFR}$, $g_{zRL}$ and $g_{zRR}$ read at the step 1302, a lateral acceleration data $G_y$, a longitudinal acceleration data $G_x$ and front-left, front-right, rear left and rear-right vertical acceleration data $G_{zFL}$, $G_{zFR}$, $G_{zRL}$ and $G_{zRR}$ are derived at a step 1304.

Then, at a step 1306, the vehicle speed indicative data V is read out. Based on the vehicle speed indicative data V, one of the plurality of the gain correction tables as shown in FIG. 7 is selected. At the step 1306, a pitching angular acceleration indicative data $\ddot{\phi}$ is derived on the basis of the front-left and rear right vertical acceleration indicative data $G_{zFL}$ and $G_{zRL}$. Namely, in the shown embodiment, an absolute value of a difference of the front-left and front-right vertical acceleration indicative data $G_{zFL}$ and $G_{zRL}$ is used as the pitching angular acceleration indicative data $\ddot{\phi}$. Based on the pitching angular acceleration indicative data $\ddot{\phi}$, a pitching angular acceleration dependent control gain KG is derived at a step 1108. In the shown embodiment, the pitching angular acceleration dependent control gain KG is variable depending upon magnitude of the pitching angular acceleration dependent control gain as shown in FIG. 13.

Thereafter, at a step 1312, vertical acceleration dependent control value $S_{GFL}$, $S_{GFR}$, $S_{GRL}$ and $S_{GRR}$ are calculated on the basis of the vertical acceleration indicative data $G_{zFL}$, $G_{zFR}$, $G_{zRL}$ and $G_{zRR}$ and the pitching angular acceleration dependent control gain KG. Practically, the vertical acceleration dependent control values $S_{GFL}$, $S_{GFR}$, $S_{GRL}$ and $S_{GRR}$ are derived by the following equations:

$$S_{GFL} = G_{zFL} \times KG$$

$$S_{GFR} = G_{zFR} \times KG$$

$$S_{GRL} = G_{zRL} \times KG$$

$$S_{GRR} = G_{zRR} \times KG$$

Then, at a step 1314, front left, front-right, rear-left and rear-right vertical motion speed data $V_{zFL}$, $V_{zFR}$, $V_{zRL}$ and $V_{zRR}$ are derived by integrating the front-left, front-right, rear-left and rear-right vertical acceleration data $G_{zFL}$, $G_{zFR}$, $G_{zRL}$ and $G_{zRR}$ over a predetermined period of time. Then, vertical motion speed dependent control values $S_{zFL}$, $S_{zFR}$, $S_{zRL}$ and $S_{zRR}$ are derived on the basis of the front-left, front-right, rear-left and rear-right vertical motion speed data $V_{zFL}$, $V_{zFR}$, and $V_{zRR}$, and the predetermined control gain Kz at the step 1316. In practice, the vertical motion speed dependent suspension control values $S_{zFL}$, $S_{zFR}$, $S_{zRL}$ and $S_{zRR}$ are derived by multiplying respective of the vertical motion speed data $V_{zFL}$, $V_{zFR}$, $V_{zRL}$ and $V_{zRR}$ with the control gain Kz.

At step 1318, an anti-pitching correction value $S_x$ is derived on the basis of the longitudinal acceleration data $G_x$. In practice, the anti pitching correction value $S_x$ is calculated by multiplying the longitudinal acceleration data $G_x$ with a predetermined anti-pitching control gain $K_x$. Similarly, at a step 1120, an anti-pitching correction value $S_y$ is derived on the basis of the lateral acceleration data $G_y$. In practice, the anti-pitching correction value $S_y$ is calculated by multiplying the lateral acceleration data $G_y$ with a predetermined anti-pitching control gain $K_y$.

The manner of deriving the anti-rolling correction value $K_y$ and the anti-pitching correction values are well disclosed in the following co pending U.S. Pat. applications Nos. 4,865,347, 488,696, and 4,872,701, set forth above. The disclosures of these co-pending U.S. Pat. application are incorporated herein by reference.

Then, the suspension control commands $S_{FL}$, $S_{FR}$, $S_{RL}$ and $S_{RR}$ are derived by the following equations, at a step 1320:

$$S_{FL} = S_{GFL} + S_{zFL} + S_x + S_y + S_N$$

$$S_{FR} = S_{GFR} + S_{zFR} + S_x + S_y + S_N$$

$$S_{RL} = S_{GRL} + S_{zRL} + S_x + S_y + S_N$$

$$S_{RR} = S_{GRR} + S_{zRR} + S_x + S_y + S_N$$

wherein $S_N$ is a predetermined height regulation control value, which can be a value for adjusting the vehicular height at neutral height position but can be set at any appropriate value. Thereafter, suspension control signals $S_C$ representative of respective of the suspension control command values $S_{FL}$, $S_{FR}$, $S_{RL}$ and $S_{RR}$ are output at a step 1032.

As can be appreciated herefrom, according to the shown embodiment, the pitching angular acceleration dependent factor is introduced by utilizing the pitching angular acceleration indicative control values $S_{GFL}$, $S_{GFR}$, $S_{GRL}$ and $S_{GRR}$, pitching suppressive control can be performed even when the vehicular pitching is induced without causing noticeable lateral acceleration.

Similarly to the foregoing, it is further possible to employ the vehicular speed dependent factor for deriving the pitching angular acceleration dependent control gain as discussed with respect to the former embodiment in terms of the gain correction value Kg. Furthermore, though the foregoing embodiments employ the pitching angular velocity and pitching angular acceleration as parameters for performing anti rolling suspension control, it may also be possible to perform the anti-pitching control on the basis of pitching angle. In addition, though the shown embodiment employs vertical accelerations as parameters representative of relative vertical displacement between the vehicular body and the vehicular wheels, it may be replaced with the vertical strokes. Furthermore, though the shown embodiments derive the pitching angular velocity and the pitching angular acceleration on the basis of the vertical accelerations at the front wheels, it may possible to use the vertical accelerations of the rear wheels or average values of the vertical accelerations of the front and rear wheels.

Therefore, as can be appreciated, the present invention fulfills all of the objects and advantages sought therefor.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, although the described embodiments are discussed in terms of hydraulic active suspension system, the invention may be applicable for any type of the active suspension systems, such as pneumatic active suspension system, hydropneumatic suspension system and the like. Furthermore, although the shown embodiments are discussed as comprising a control system including microprocessor which performs digital process in derivation of the suspension control signals, the present invention can also be implemented by analog circuit. In such a case, the analog circuit may employ a gain controlled amplifier for adjusting amplifier gain for amplifying the vertical acceleration data or any other equivalent data representative of vertical displacement of the vehicular body relative to the vehicular wheel. Furthermore, though the shown embodiments have been discussed for anti-rolling suspension control and anti-pitching suspension control, it may be more practical to form the suspension control system with facilitating both control functions.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An active suspension system comprising:

suspension systems, each being disposed between a vehicular body and a road wheel, each of said suspension systems including a variable pressure working chamber for generating a damping force acting against relative displacement between the vehicular body and the road wheel;

a hydraulic system connected to said working chambers for adjusting fluid pressure therein, said hydraulic system including pressure control valves for respectively controlling introduction and draining of pressurized fluid to said working chambers for adjusting the fluid pressure in said working chambers;

first sensors for monitoring a vertical displacement of the vehicular body at mutually different positions of the vehicular body for producing first sensor signals respectively representative of the vertical displacement of the vehicular body at the different positions; and control means responsive to the first sensor signals from said first sensors to determine a vehicular attitude variation, said control means outputting control signals based on the vehicular attitude variation to the pressure control valves respectively to provide control pressure in the working chambers of said suspension systems for thereby suppressing the vehicular attitude variation.

2. An active suspension system as set forth in claim 1, wherein said first sensors monitor a vertical acceleration exerted at the different positions of the vehicular body to respectively produce said first sensor signals indicative thereof.

3. An active suspension system as set forth in claim 2, wherein said control means processes said first sensor signals for deriving an angular velocity of the vehicular attitude variation for deriving said control signals on the basis thereof.

4. An active suspension system as set forth in claim 3, wherein said control means processes said first sensor signals for deriving vertical motion speeds at the different positions of the vehicular body and derives said angular velocity of vehicular attitude variation on the basis of said vertical motion speeds.

5. An active suspension system as set forth in claim 2, wherein said control means processes said first sensor signals for deriving an angular acceleration of the vehicular attitude variation for deriving said control signals based thereon.

6. An active suspension system as set forth in claim 1, wherein said control means derives vertical motion speeds respectively on the basis of said first sensor signals at the different positions of the vehicular body for deriving a vertical motion suppressive pressure on the basis thereof, deriving a correction value for correcting said vertical motion suppressive pressure on the basis of the vehicular attitude variation for deriving said control signals.

7. An active suspension system as set forth in claim 6, wherein each of said first sensors monitors vertical acceleration at the different positions of the vehicular body and said control means derives an angular velocity of the vehicular attitude variation for deriving said correction value based thereon.

8. An active suspension system as set forth in claim 6, wherein each of said first sensors monitors vertical acceleration at the different positions of the vehicular body and said control means derives an angular velocity of the vehicular attitude variation for deriving said correction value based thereon.

9. A rolling suppressive active suspension system comprising:
  suspension systems each being disposed between a vehicular body and a road wheel, each of said suspension systems including a variable pressure working chamber for generating a damping force acting against relative displacement between the vehicular body and the road wheel;
  a hydraulic system connected to said working chambers for adjusting fluid pressure therein, said hydraulic system including a pressure control valves for respectively controlling introduction and draining of pressurized fluid to said working chambers for adjusting the fluid pressure in said working chambers;
  first sensors for monitoring vertical displacement of the vehicular body at mutually different positions of the vehicular body for producing first sensor signals respectively representative of the vertical displacement of the vehicular body at the different positions; and
  control means responsive to the first sensor signals from said first sensors to determine vehicular rolling, said control means outputting control signals based on the vehicular rolling to the pressure control valves respectively to provide control pressure in the working chambers of said suspension systems for thereby suppressing the vehicular rolling.

10. An active suspension system as set forth in claim 9, wherein each of said first sensors monitor and a vertical acceleration exerted on the different positions of the vehicular body to respectively produce said first sensor signals indicative thereof.

11. An active suspension system as set forth in claim 10, wherein said control means processes said first sensor signals for deriving an angular velocity of the vehicular rolling for deriving said control signals on the basis thereof.

12. An active suspension system as set forth in claim 11, wherein said control means processes said first sensor signals for deriving vertical motion speeds at the different positions of the vehicular body and derives said angular velocity rolling on the basis of said vertical motion speeds.

13. An active suspension system as set forth in claim 10, wherein said control means processes said first sensor signals for deriving an angular acceleration of vehicular rolling for deriving said control signals based thereon.

14. An active suspension system as set forth in claim 9, wherein said control means derives vertical motion speeds respectively on the basis of said first sensor signals at the different positions of the vehicular body for deriving said vertical motion suppressive pressure on the basis of the vertical motion speeds, and derives a correction value for correcting said vertical motion suppressive pressure on the basis of the vehicular rolling for thereby deriving said control signals.

15. An active suspension system as set forth in claim 14, wherein each of said first sensors monitors a vertical acceleration at the different positions of the vehicular body and said control means derives an angular velocity of vehicular rolling for deriving said correction value based thereon.

16. An active suspension system as set forth in claim 14, wherein each of said first sensors monitors a vertical acceleration at the different positions of the vehicular body and said control means derives an angular acceleration of vehicular rolling for deriving said correction value based thereon.

17. A pitching suppressive active suspension system comprising:
  suspension systems, each being disposed between a vehicular body and a road wheel, each of said suspension systems including a variable pressure working chamber for generating a damping force acting against relative displacement between the vehicular body and the road wheel;
  a hydraulic system connected to said working chambers for adjusting fluid pressure therein, said hydraulic system including pressure control valves for respectively controlling introduction and draining of pressurized fluid to aid working chambers for adjusting the fluid pressure in said working chambers;
  first sensors for monitoring vertical displacement of the vehicular body at mutually different positions of the vehicular body for producing first sensor signals respectively representative of the vertical displacement of the vehicular body at the different positions; and control means responsive to the first sensor signals to determine a vehicular pitching, said control means outputting control signals based on the vehicular pitching to the pressure control valves respectively to provide control for thereby suppressing the vehicular pitching.

18. An active suspension system as set forth in claim 17, wherein said first sensors monitor a vertical acceleration exerted at the different positions of the vehicular body to respectively produce said first sensor signals indicative thereof.

19. An active suspension system as set forth in claim 18, wherein said control means processes said first sensor signals for deriving an angular velocity of the vehicular pitching for deriving said control signals on the basis thereof.

20. An active suspension system as set forth in claim 19, wherein said control means processes said first sensor signals for deriving vertical motion speeds at the different positions of the vehicular body and derives said angular velocity of vehicular pitching on the basis of said vertical motion speeds.

21. An active suspension system as set forth in claim 18, wherein said control means processes said first sensor signals for deriving an angular acceleration of the vehicular pitching for deriving said control signals based thereon.

22. An active suspension system as set forth in claim 17, wherein said control means derives vertical motion speeds respectively on the basis of said first sensor signals at the different positions of the vehicular body for deriving a vertical motion suppressive pressure on the basis thereof, deriving a correction value for correcting said vertical motion suppressive pressure on the basis of the vehicular pitching for deriving said control signals.

23. An active suspension system as set forth in claim 22, wherein each of said first sensors monitors a vertical acceleration at the different positions of the vehicular body and said control means derives an angular velocity of the vehicular attitude variation for deriving said correction value based thereon.

24. An active suspension system as set forth in claim 22, wherein each of said first sensor monitors a vertical acceleration at the different positions of the vehicular body and said control means derives an angular acceleration of vehicular pitching for deriving said correction value based thereon.

25. An active suspension system for a vehicle comprising:

suspension systems disposed between a vehicle body and suspension members which respectively support vehicle wheels rotatably, each of said suspension systems including a fluid cylinder adjustable of cylinder pressure for active suspension control:

first sensors respectively detecting vertical accelerations acting on different portions of the vehicle body to provide first sensor signals indicative thereof;

a second sensor detecting acceleration acting on the horizontal plane of the vehicle body to provide a second sensor signal indicative thereof;

a power source unit which supplied pressurized fluid to the fluid cylinder;

pressure control valves for adjusting pressure of the fluid supplied from said power source unit to the fluid cylinders; and control means responsive to the first sensor signals to determine a first vehicle attitude change caused by vertical acceleration and also responsive to the second sensor signal to determine a second vehicle attitude change caused by acceleration in the horizontal plane of the vehicle body to provide first and second control signals to said pressure control valves respectively for providing control pressures in the fluid cylinders for suppressing the first and second vehicle attitude changes.

26. An active suspension system as set forth in claim 25, wherein said first sensors are disposed on front and rear portions of the vehicle body and said second sensor detects longitudinal acceleration, said control means determining the first vehicle attitude change representing first pitching motion of the vehicle body based on a difference in the magnitudes between the vertical accelerations acting on the front and rear portions and bouncing motion of the vehicle body and said control means also determines the second vehicle attitude change representing second pitching motion of the vehicle body caused by longitudinal acceleration.

27. An active suspension system as set forth in claim 25, wherein said first sensors are disposed on right and left portions of the vehicle body and said second sensor detects lateral acceleration, said control means determining the first vehicle attitude change representing first rolling motion of the vehicle body based on a difference in the magnitudes between the vertical accelerations acting on the right and left portions and bouncing motion of the vehicle body and also determining the second vehicle attitude change representing second rolling motion of the vehicle body caused by lateral acceleration.

28. An active suspension system as set forth in claim 26, wherein said control means determines vertical motion speeds of the front and rear portions of the vehicle body based on the detected vertical accelerations to determine the first vehicle attitude change including a pitching angular velocity.

29. An active suspension system as set forth in claim 27, wherein said control means determines vertical motion speeds of the right and left portions of the vehicle body based on the detected vertical accelerations to determine the first vehicle attitude change including a rolling angular velocity.

30. An active suspension system as set forth in claim 28, wherein said control means determines a correction gain based on the pitching angular velocity to provide the first control signal based on the correction gain.

31. An active suspension system as set forth in claim 27, wherein said control means determines a correction gain based on the rolling angular velocity to provide the first control signal based on the correction gain.

32. An active suspension system as set forth in claim 30, wherein said correction gain is variable dependent upon vehicle speed.

33. An active suspension system as set forth in claim 31 wherein said correction gain is variable dependent upon vehicle speed.

34. An active suspension system as set forth in claim 32, wherein said correction gain is variable dependent upon the pitching angular velocity.

35. An active suspension system as set forth in claim 33 wherein said correction gain is variable dependent upon the rolling angular velocity.

* * * * *